United States Patent
Yang et al.

(10) Patent No.: US 10,116,895 B2
(45) Date of Patent: Oct. 30, 2018

(54) SIGNAL DISPLAY OUTPUT METHOD, APPARATUS, AND SYSTEM

(71) Applicant: Huawei Technologies Co., Ltd., Shenzhen, Guangdong (CN)

(72) Inventors: Jichun Yang, Wuhan (CN); Juntao Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/553,916

(22) PCT Filed: Mar. 6, 2015

(86) PCT No.: PCT/CN2015/073759
§ 371 (c)(1),
(2) Date: Aug. 25, 2017

(87) PCT Pub. No.: WO2016/141507
PCT Pub. Date: Sep. 15, 2016

(65) Prior Publication Data
US 2018/0070046 A1    Mar. 8, 2018

(51) Int. Cl.
*H04N 7/173* (2011.01)
*H04N 5/455* (2006.01)
(Continued)

(52) U.S. Cl.
CPC ......... *H04N 5/455* (2013.01); *H04N 21/2381* (2013.01); *H04N 21/43635* (2013.01); *H04N 21/61* (2013.01)

(58) Field of Classification Search
CPC .. H04N 5/4401; H04N 5/455; H04N 21/2381; H04N 21/43635; H04N 21/61;
(Continued)

(56) References Cited

U.S. PATENT DOCUMENTS

2011/0321116 A1* 12/2011 Liu ................ H04N 5/775
725/151
2013/0084052 A1   4/2013 Huang et al.
2013/0227619 A1*  8/2013 Lewis ............. H01Q 1/007
348/726

FOREIGN PATENT DOCUMENTS

CN    101047775 A    10/2007
CN    201563164 U    8/2010
(Continued)

OTHER PUBLICATIONS

V Box Communications; "XTi—VBox TV Gateway 33XX family selection Guide"; Retrieved from the Internet http://docplayer.net/42317359-Xti-vbox-tv-gateway-33xx-family-selection-guide-product-version-1-0-release-date-june-2013-document-revision-1-0.html; Jun. 30, 2013; 10 pages.

Primary Examiner — Sherrie Hsia (57) ABSTRACT

The present invention discloses a signal display output method, apparatus and system, which pertain to the field of computer technologies. The method includes: receiving, by a TV box expansion device, a radio television signal by using a radio frequency port; performing, by the TV box expansion device, demodulation processing on the radio television signal to obtain a to-be-decoded digital signal; and sending, by the TV box expansion device, the to-be-decoded digital signal to an IP TV box, so that the IP TV box performs decoding processing on the to-be-decoded digital signal to obtain the decoded digital signal for display output. Use flexibility of the IP TV box can be improved by using the present invention.

9 Claims, 4 Drawing Sheets

(51) Int. Cl.
*H04N 21/61* (2011.01)
*H04N 21/2381* (2011.01)
*H04N 21/4363* (2011.01)

(58) Field of Classification Search
CPC ............. H04N 21/4622; H04N 21/435; H04N 21/235; H04N 21/4126; H04N 5/44; H04N 7/173; H04N 7/16
USPC ......... 348/725, 726; 725/110–115, 139–142, 725/151–153
See application file for complete search history.

(56) References Cited

FOREIGN PATENT DOCUMENTS

| | | |
|---|---|---|
| CN | 102843601 A | 12/2012 |
| CN | 103763630 A | 4/2014 |
| EP | 2704428 A2 | 3/2014 |
| KR | 1020090092946 A | 9/2009 |

\* cited by examiner

SIGNAL DISPLAY OUTPUT METHOD, APPARATUS, AND SYSTEM

CROSS-REFERENCE TO RELATED APPLICATIONS

This application is a National Stage of International Application No. PCT/CN2015/073759, filed on Mar. 6, 2015, which is hereby incorporated by reference in its entirety.

TECHNICAL FIELD

The present invention relates to the field of computer technologies, and in particular, to a signal display output method, apparatus, and system.

BACKGROUND

With continuous development of network technologies, people pay increasing attention to an IP (Internet Protocol, Internet Protocol) TV box. The IP TV box is a device that obtains a digital television signal by using the Internet, decodes the digital television signal, and converts the decoded digital television signal into an analog signal.

Generally, an IP TV box is provided with a network interface. A user may connect the IP TV box to the Internet by using a network cable. The IP TV box may obtain corresponding network data (such as video data) on the Internet, and send the network data to a CPU (Central Processing Unit, central processing unit) for decoding. After converting a digital signal of the decoded network data into an analog signal, the IP TV box sends the analog signal to a television for display output.

In a process of implementing the present invention, the inventor finds that the prior art has at least the following problems:

Generally, for an IP TV box, a user can obtain a digital television signal by using the Internet only, and then, after processing the digital television signal, the IP TV box provides the processed digital television signal for a television for display output. If the user needs to obtain, by using a radio frequency line (such as a common coaxial cable), a radio television signal to watch a television program, this cannot be achieved by using the IP TV box. Consequently, use flexibility of the IP TV box is poor.

SUMMARY

To resolve a problem in the prior art, embodiments of the present invention provide a signal display output method, apparatus, and system. The technical solutions are as follows:

According to a first aspect, a signal display output method is provided, where the method includes:

receiving, by a TV box expansion device, a radio television signal by using a radio frequency port;

performing, by the TV box expansion device, demodulation processing on the radio television signal to obtain a to-be-decoded digital signal; and sending, by the TV box expansion device, the to-be-decoded digital signal to an Internet Protocol IP TV box, so that the IP TV box performs decoding processing on the to-be-decoded digital signal to obtain the decoded digital signal for display output.

With reference to the first aspect, in a first possible implementation manner of the first aspect, before the receiving, by a TV box expansion device, a radio television signal by using a radio frequency port, the method further includes:

connecting the TV box expansion device and the IP TV box to each other by using a high definition multimedia interface HDMI cable; and the sending, by the TV box expansion device, the to-be-decoded digital signal to an Internet Protocol IP TV box includes:

sending, by the TV box expansion device, the to-be-decoded digital signal to the IP TV box by using the HDMI cable.

With reference to the first aspect, in a second possible implementation manner of the first aspect, after the sending, by the TV box expansion device, the to-be-decoded digital signal to an Internet Protocol IP TV box, the method further includes:

receiving, by the TV box expansion device, the decoded digital signal sent by the IP TV box, and storing the decoded digital signal.

With reference to the first aspect, in a third possible implementation manner of the first aspect, the radio television signal includes a first television signal and a second television signal;

the performing, by the TV box expansion device, demodulation processing on the radio television signal to obtain a to-be-decoded digital signal includes:

performing, by the TV box expansion device, demodulation processing on the first television signal to obtain a to-be-decoded first digital signal, and performing demodulation processing on the second television signal to obtain a to-be-decoded second digital signal;

the sending, by the TV box expansion device, the to-be-decoded digital signal to an Internet Protocol IP TV box includes:

sending, by the TV box expansion device, the to-be-decoded first digital signal and the to-be-decoded second digital signal to the Internet Protocol IP TV box; and the method further includes:

receiving, by the TV box expansion device, a decoded second digital signal sent by the IP TV box, and storing the decoded second digital signal.

According to a second aspect, a signal display output method is provided, where the method includes:

receiving, by an Internet Protocol IP TV box, a to-be-decoded digital signal sent by a TV box expansion device, where the to-be-decoded digital signal is a digital signal obtained, by the TV box expansion device, by performing demodulation processing on a radio television signal received by a radio frequency port; and performing, by the IP TV box, decoding processing on the to-be-decoded digital signal to obtain the decoded digital signal for display output.

With reference to the second aspect, in a first possible implementation manner of the second aspect, the to-be-decoded digital signal includes a to-be-decoded first digital signal and a to-be-decoded second digital signal, where the to-be-decoded first digital signal is a to-be-decoded digital signal obtained, by the TV box expansion device, by demodulating a first television signal in the radio television signal, and the to-be-decoded second digital signal is a to-be-decoded digital signal obtained, by the TV box expansion device, by demodulating a second television signal in the radio television signal;

the performing, by the IP TV box, decoding processing on the to-be-decoded digital signal to obtain the decoded digital signal for display output includes:

performing, by the IP TV box, decoding processing on the to-be-decoded first digital signal to obtain the decoded first digital signal for display output; and the method further includes:

performing, by the IP TV box, decoding processing on the to-be-decoded second digital signal to obtain the decoded second digital signal; and sending, by the IP TV box, the decoded second digital signal to the TV box expansion device, so that the TV box expansion device stores the decoded second digital signal.

According to a third aspect, a TV box expansion device is provided, where the device includes:

a receiver, configured to receive a radio television signal by using a radio frequency port;

a processor, configured to perform demodulation processing on the radio television signal to obtain a to-be-decoded digital signal; and a transmitter, configured to send the to-be-decoded digital signal to an Internet Protocol IP TV box, so that the IP TV box performs decoding processing on the to-be-decoded digital signal to obtain the decoded digital signal for display output.

With reference to the third aspect, in a first possible implementation manner of the third aspect, the TV box expansion device and the IP TV box are connected to each other by using a high definition multimedia interface HDMI cable; and the transmitter is configured to:

send the to-be-decoded digital signal to the IP TV box by using the HDMI cable.

With reference to the third aspect, in a second possible implementation manner of the third aspect, the receiver is configured to receive the decoded digital signal sent by the IP TV box; and the device further includes a memory, configured to:

store the decoded digital signal.

With reference to the third aspect, in a third possible implementation manner of the third aspect, the radio television signal includes a first television signal and a second television signal;

the processor is configured to:

perform demodulation processing on the first television signal to obtain a to-be-decoded first digital signal, and perform demodulation processing on the second television signal to obtain a to-be-decoded second digital signal;

the transmitter is configured to:

send the to-be-decoded first digital signal and the to-be-decoded second digital signal to the Internet Protocol IP TV box;

the receiver is further configured to:

receive a decoded second digital signal sent by the IP TV box; and the device further includes a memory, configured to:

store the decoded second digital signal.

According to a fourth aspect, an IP TV box is provided, where the IP TV box includes:

a receiver, configured to receive a to-be-decoded digital signal sent by a TV box expansion device, where the to-be-decoded digital signal is a digital signal obtained, by the TV box expansion device, by performing demodulation processing on a radio television signal received by a radio frequency port; and a processor, configured to perform decoding processing on the to-be-decoded digital signal to obtain the decoded digital signal for display output.

With reference to the fourth aspect, in a first possible implementation manner of the fourth aspect, the to-be-decoded digital signal includes a to-be-decoded first digital signal and a to-be-decoded second digital signal, where the to-be-decoded first digital signal is a to-be-decoded digital signal obtained, by the TV box expansion device, by demodulating a first television signal in the radio television signal, and the to-be-decoded second digital signal is a to-be-decoded digital signal obtained, by the TV box expansion device, by demodulating a second television signal in the radio television signal;

the processor is configured to:

perform decoding processing on the to-be-decoded first digital signal to obtain the decoded first digital signal for display output; and perform decoding processing on the to-be-decoded second digital signal to obtain the decoded second digital signal; and the IP TV box further includes a transmitter, configured to:

send the decoded second digital signal to the TV box expansion device, so that the TV box expansion device stores the decoded second digital signal.

According to a fifth aspect, a signal display output system is provided, where the system includes an IP TV box and a TV box expansion device;

the TV box expansion device is configured to: receive a radio television signal by using a radio frequency port; perform demodulation processing on the radio television signal to obtain a to-be-decoded digital signal; and send the to-be-decoded digital signal to the Internet Protocol IP TV box; and the IP TV box is configured to: receive the to-be-decoded digital signal sent by the TV box expansion device; and perform decoding processing on the to-be-decoded digital signal to obtain the decoded digital signal for display output.

A beneficial effect brought by the technical solutions provided in the embodiments of the present invention is as follows:

In the embodiments of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Embodiment 1

Figure 1:
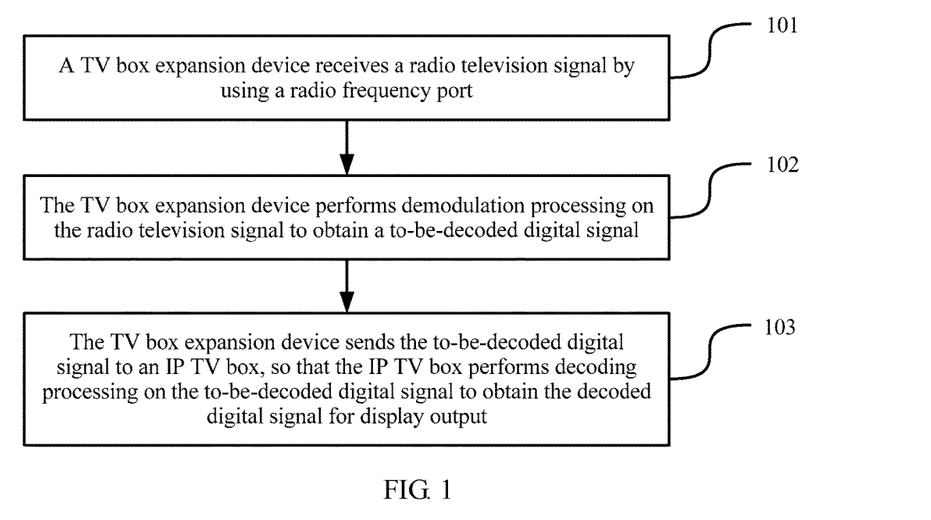
FIG. 1 is a flowchart of a signal display output method according to an embodiment of the present invention.

An embodiment of the present invention provides a signal display output method. As shown in FIG. 1, a processing process of a TV box expansion device in the method may include the following steps:

Step 101: The TV box expansion device receives a radio television signal by using a radio frequency port.

Step 102: The TV box expansion device performs demodulation processing on the radio television signal to obtain a to-be-decoded digital signal.

Step 103: The TV box expansion device sends the to-be-decoded digital signal to an IP TV box, so that the IP TV box performs decoding processing on the to-be-decoded digital signal to obtain the decoded digital signal for display output.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

Embodiment 2

Figure 2:
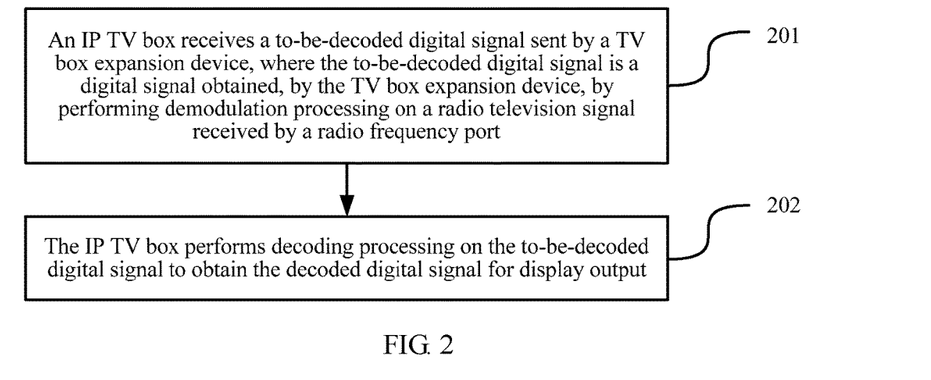
FIG. 2 is a flowchart of a signal display output method according to another embodiment of the present invention.

An embodiment of the present invention provides a signal display output method. As shown in FIG. 2, a processing process of an IP TV box in the method may include the following steps:

Step 201: The IP TV box receives a to-be-decoded digital signal sent by a TV box expansion device, where the to-be-decoded digital signal is a digital signal obtained, by the TV box expansion device, by performing demodulation processing on a radio television signal received by a radio frequency port.

Step 202: The IP TV box performs decoding processing on the to-be-decoded digital signal to obtain the decoded digital signal for display output.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

Embodiment 3

An embodiment of the present invention provides a signal display output method, where the method may be jointly implemented by an IP TV box and a TV box expansion device, and the TV box expansion device may be a secondary device of the IP TV box. The TV box expansion device may include several devices, such as a tuning device (which may also be referred to as a demodulation device). The IP TV box may be referred to as an IP digital television receiving box or an IP set-top box. The IP TV box is a device configured to perform processing such as decoding or conversion on a digital television signal.

Figure 3:
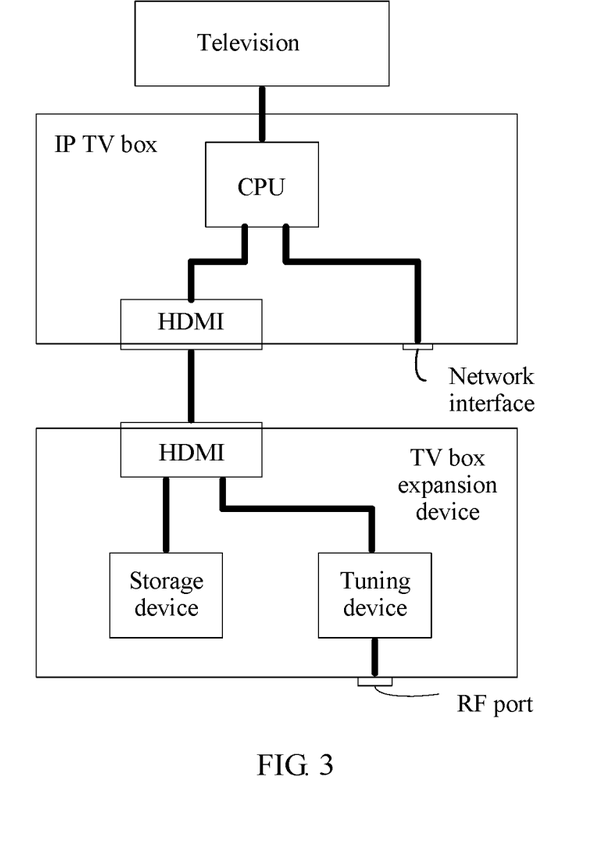
FIG. 3 is a schematic diagram of a system framework according to an embodiment of the present invention.

As shown in FIG. 3, a signal display output system may include an IP TV box, a TV box expansion device, and a television, where the IP TV box and the television may be connected by using a corresponding port, and the IP TV box and the TV box expansion device may be connected by using a specific preset port.

As shown in FIG. 3, the IP TV box is provided with a network interface. The network interface may be an RJ45 (Registered Jack 45, registered jack 45) interface, or the like. The IP TV box may receive network data by using the network interface, and the network data may be data corresponding to a digital television signal. Then, the IP TV box may transmit the network data to a CPU, and the CPU performs decoding processing on the network data to obtain the decoded network data. The decoded network data may be video data or audio data. The IP TV box includes a digital-to-analog conversion device, which is configured to convert a digital signal into an analog signal. After obtaining the decoded network data, the IP TV box may convert a digital signal corresponding to the decoded network data into an analog signal by using the digital-to-analog conversion device, and the IP TV box may send the analog signal to the television. After receiving the analog signal, the television may display the analog signal. For example, if the decoded network data is video data, after receiving the video data, the television may display a video corresponding to the video data; or if the decoded network data is audio data, after receiving the audio data, the television may play a video corresponding to the audio data.

The IP TV box includes only the network interface, and can receive only the network data (that is, the data corresponding to the digital television signal). If a user currently has only a radio television signal, the IP TV box cannot properly work. Therefore, a function of the IP TV box may be expanded, and one TV box expansion device may be produced for the IP TV box, so as to receive the radio television signal. The TV box expansion device may provide an additional function for the IP TV box. The user may perform a corresponding operation on the TV box expansion device by using a corresponding software program, so that the IP TV box implements a corresponding function.

Figure 4:
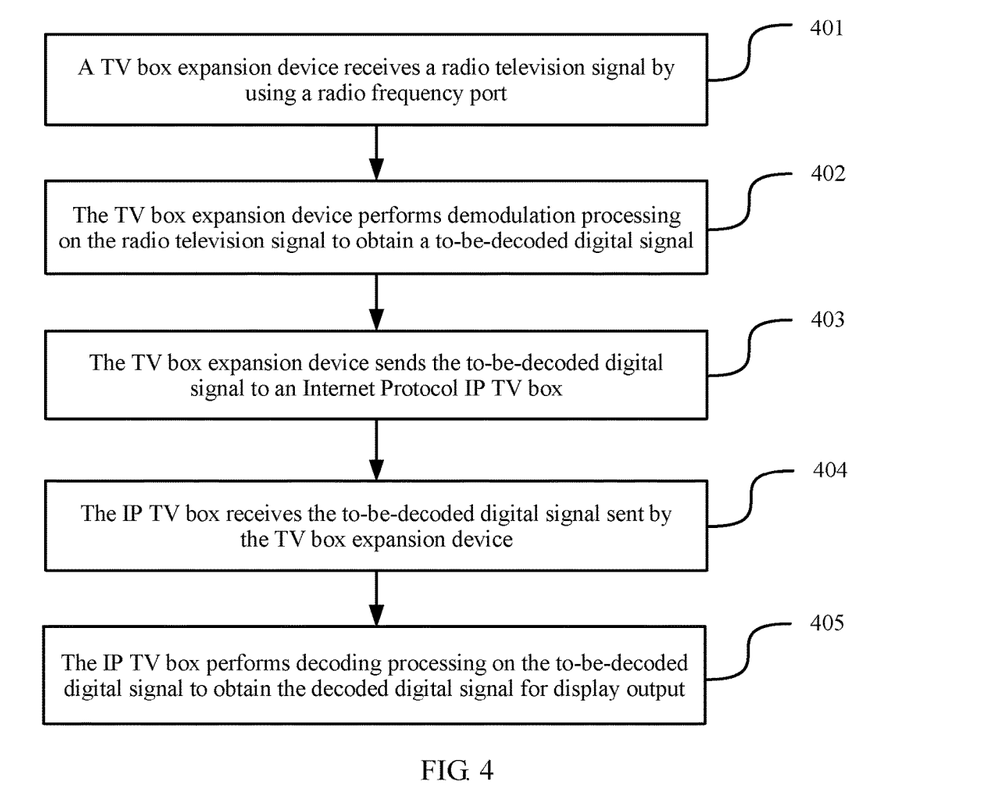
FIG. 4 is a flowchart of a signal display output method according to an embodiment of the present invention.

As shown in FIG. 4, a processing process of the signal display output method provided in this embodiment of the present invention may include the following steps:

Step 401: ATV box expansion device receives a radio television signal by using a radio frequency port.

The radio frequency port may be an RF (Radio Frequency, radio frequency) port. The radio television signal may be a signal that is modulated and that has a specific transmit frequency, and the radio television signal may be a video signal, or may be an audio signal. The radio television signal is different from a digital television signal received by an IP TV box by using a network interface. The digital television signal is a signal that is not modulated. If the digital television signal is modulated by using a modulation device, and after the modulated signal is transmitted by using a transmitting device in the specific transmit frequency, an obtained signal may be the radio television signal.

In implementation, the TV box expansion device may implement different functions corresponding to a DVB (Digital Video Broadcasting, digital video broadcasting) transmission system, that is, a display output function may be performed by using the radio television signal. Correspondingly, TV boxes based on the DVB transmission system may fall into many types, such as a DVB-C (Digital Video Broadcasting-Cable) TV box, a DVB-T/T2 (Digital Video Broadcasting-Terrestrial) TV box, and a DVB-S/S2 (Digital Video Broadcasting-Satellite) TV box; the DVB transmission system is divided into two parts: source coding/decoding and channel coding/decoding. Regarding the source coding, an MPEG-2 (Moving Picture Experts Group 2, Moving Picture Experts Group 2) code stream is used, and a processing process may be as follows: The audio signal and the video signal are first multiplexed, and then multiple digital television program data streams are multiplexed for transmission. Corresponding demultiplexing and decoding are performed at a receive end. The channel coding/decoding includes forward error correction coding, decoding, modulation, demodulation, and up-/down-conversion. Different modulation modes may be used in different signal transmission modes. The TV box expansion device may further include an antenna and a radio frequency port. A user may connect one end of a coaxial cable to the radio frequency port, and may connect another end of the coaxial cable to the antenna. The antenna may receive the radio television signal, and transmit the radio television signal to the radio frequency port by using the coaxial cable. The TV box expansion device may receive the radio television signal by using the radio frequency port.

Step 402: The TV box expansion device performs demodulation processing on the radio television signal to obtain a to-be-decoded digital signal.

The demodulation is a process of restoring the message from a modulated signal that carries the message. In this embodiment of the present invention, the demodulation may be a process of extracting the to-be-decoded digital signal in the radio television signal from a carrier.

In implementation, as shown in FIG. 3, the TV box expansion device is provided with a tuning device, which is configured to perform demodulation processing on the modulated signal to obtain the message carried in the signal, or the like. After receiving the radio television signal, the TV box expansion device may transmit the radio television signal to the tuning device. The tuning device receives the radio television signal, and performs demodulation processing on the radio television signal. After the demodulation processing is performed by the tuning device, a demodulated to-be-decoded digital signal is output.

Step 403: The TV box expansion device sends the to-be-decoded digital signal to an IP TV box.

In implementation, as shown in FIG. 3, after obtaining the to-be-decoded digital signal, the TV box expansion device may divide data corresponding to the to-be-decoded digital signal into multiple segments. One packet may be set for each data segment, and one serial number is set for each packet according to a time sequence of each data segment. The TV box expansion device may send multiple packets and corresponding serial numbers to the IP TV box by using a corresponding interface.

Optionally, the TV box expansion device and the IP TV box may be connected in various modes. The following provides an optional connection mode, which may be specifically as follows: The TV box expansion device and the IP TV box are connected to each other by using an HDMI cable. Correspondingly, there may be various processing modes in the step 403. The following provides an optional processing mode, which may specifically include the following content: The TV box expansion device sends the to-be-decoded digital signal to the IP TV box by using the HDMI cable.

In implementation, the TV box expansion device and the IP TV box may be connected by using an HDMI. Generally, an HDMI includes 19 connection pins with different functions. A hardware design engineer may set corresponding functions for the 19 connection pins as required, and there may be various setting modes. The following provides an optional setting mode, which may be specifically shown in Table 1.

TABLE 1

| Connection Pin Number | Function of a Modified HDMI Connection Pin |
| --- | --- |
| H1 | SATA_TX+ |
| H2 | SATA_TX− |
| H3 | SATA_RX+ |
| H4 | SATA_RX− |
| H5 | GND |
| H6 | TS_CLK0 |
| H7 | TS_DATA0 |
| H8 | TS_SYN0 |
| H9 | TS_VAR0 |
| H10 | TS_ERR0 |
| H11 | GND |
| H12 | TS_CLK1 |
| H13 | TS_DATA1 |
| H14 | TS_SYN1 |
| H15 | TS_VAR1 |
| H16 | TS_ERR1 |
| H17 | TS_SCL |
| H18 | TS_SDA |
| H19 | 5 V |

TS (Transport Stream) indicates a transport stream. GND (Ground) indicates a ground cable. TX+ (Transmit+) indicates a positive data transmission end. TX− (Transmit−) indicates a negative data transmission end. RX+ (Receive+) indicates a positive data receiving end. RX− (Receive−) indicates a negative data receiving end. SYN (synchronous) indicates signal synchronization. VAR indicates valid data. ERR indicates an error message. SCL (Serial Clock) indicates an IIC (Inter-Integrated Circuit, inter-integrated circuit bus) clock signal. SDA (Serial Data) indicates an IIC data signal.

The setting mode is only an optional mode, and a user may further perform an arbitrary setting according to an actual situation.

Step 404: The IP TV box receives the to-be-decoded digital signal sent by the TV box expansion device.

In implementation, the IP TV box receives, by using the corresponding interface, a packet that carries the to-be-decoded digital signal sent by the TV box expansion device.

Step 405: The IP TV box performs decoding processing on the to-be-decoded digital signal to obtain the decoded digital signal for display output.

The decoding may be a process of converting a signal, a radio wave, or the like that is coded in a specific mode into a message, data, or the like that is represented by the signal, the radio wave, or the like.

In implementation, for ease of transmission and storage of a signal, a hardware design engineer can perform coding on a television program signal, so as to obtain a to-be-decoded digital signal. Then, the to-be-decoded digital signal may be transmitted after being modulated, so that a user receives a radio television signal by using an antenna. As shown in FIG. 3, the IP TV box extracts the data corresponding to the to-be-decoded digital signal from the packet, and transmits the data to a CPU of the IP TV box. A decoding program is stored in the CPU. Then, the CPU may perform decoding processing on the to-be-decoded digital signal by using the decoding program to obtain the decoded digital signal. The IP TV box includes a digital-to-analog conversion device, which is configured to convert a digital signal into an analog signal. After obtaining the decoded digital signal, the IP TV box may convert the decoded digital signal into an analog signal by using the digital-to-analog conversion device. The IP TV box may send the analog signal to a television by using a corresponding data transmission interface. After receiving the analog signal, the television may transmit the analog signal to a display screen of the television. If the decoded digital signal is a video signal, the television may display a video image, and play corresponding sound data; or if the decoded digital signal is the audio signal, the television may play corresponding sound data. In this way, a user may receive the radio television signal by using the TV box expansion device, and obtain the processed digital signal by using the IP TV box. Finally, the processed digital signal is transmitted to the television, so as to display a corresponding video signal.

Optionally, the TV box expansion device includes a storage device (such as a hard disk), which is configured to store data. Correspondingly, after a processing process in the step 401 to step 405 is completed, the signal display output method may further include the following processing process, which may specifically include the following content: The TV box expansion device receives the decoded digital signal sent by the IP TV box, and stores the decoded digital signal.

In implementation, the TV box expansion device may be provided with a push-button for storing television program data. If a user needs to store data of a specific television program, the user may press the push-button to trigger the TV box expansion device to enable a corresponding storage function. In this case, the IP TV box may send the decoded digital signal to the TV box expansion device; and the TV box expansion device receives the decoded digital signal, and stores the decoded digital signal into the storage device. The TV box expansion device may be provided with a push-button for replaying the stored television program data. If the user needs to replay the stored data, the user may press the push-button. In this case, the TV box expansion device is triggered to send the stored data to the television for display output. In this way, the TV box expansion device of the IP TV box may store corresponding television program data by using the storage device, so that the IP TV box has a PVR (Personal video recorder, personal video recording) function.

Optionally, in the processing process in the step 401 to step 405, the radio television signal may include television signals corresponding to multiple channels, and there may be various corresponding processing processes. The following provides an optional processing process, that is, the radio television signal includes a first television signal and a second television signal, and the processing process may specifically include the following steps:

Step 1: A TV box expansion device performs demodulation processing on the first television signal to obtain a to-be-decoded first digital signal, and performs demodulation processing on the second television signal to obtain a to-be-decoded second digital signal.

The first television signal and the second television signal may be a television signal corresponding to any channel, and a channel corresponding to the first television signal is different from a channel corresponding to the second television signal.

In implementation, the radio television signal may include the first television signal and the second television signal. A user can set an IP TV box in advance: performing display output on the first television signal, and storing the second television signal. The TV box expansion device may be provided with two tuning devices. If the TV box expansion device detects that an HDMI includes two television signals corresponding to different channels, the TV box expansion device may transmit either of the two television signals to one of the two tuning devices, and transmit another television signal to the other tuning device. The two tuning devices separately perform demodulation processing on a corresponding signal to separately obtain the to-be-decoded first digital signal and the to-be-decoded second digital signal.

Step 2: The TV box expansion device sends the to-be-decoded first digital signal and the to-be-decoded second digital signal to an IP TV box.

For a detailed processing process, refer to the content, and details are not described herein.

Step 3: The IP TV box performs decoding processing on the to-be-decoded first digital signal to obtain the decoded first digital signal for display output.

For a detailed processing process, refer to the content, and details are not described herein.

Step 4: The IP TV box performs decoding processing on the to-be-decoded second digital signal to obtain the decoded second digital signal.

For a detailed processing process, refer to the content, and details are not described herein.

Step 5: The IP TV box sends the decoded second digital signal to the TV box expansion device.

Step 6: The TV box expansion device receives the decoded second digital signal sent by the IP TV box, and stores the decoded second digital signal.

In implementation, the TV box expansion device includes a storage device (such as a hard disk), which is configured to store data. The TV box expansion device may be provided with a push-button for storing television program data. If a user needs to store data of a specific television program, the user may press the push-button to select data corresponding to the decoded second digital signal in two signals as to-be-stored data. In this case, the TV box expansion device enables a corresponding storage function; the IP TV box may send the decoded second digital signal to the TV box expansion device; and the TV box expansion device receives the decoded second digital signal, and stores the decoded second digital signal into the storage device.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

Embodiment 4

Figure 5:
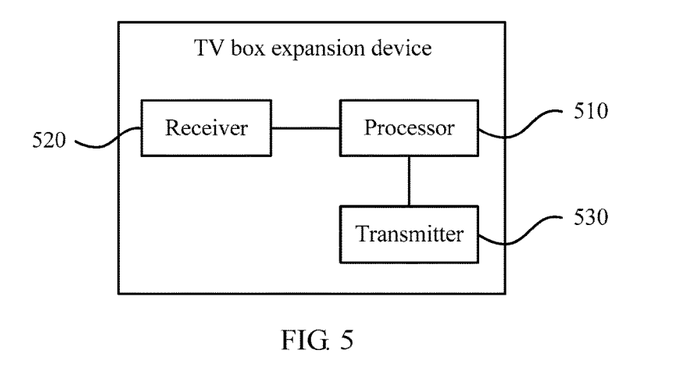
FIG. 5 is a schematic structural diagram of a TV box expansion device according to an embodiment of the present invention.

FIG. 5 is a schematic structural diagram of a TV box expansion device according to an embodiment of the present invention. The TV box expansion device may be configured to implement a signal display output method provided in the foregoing embodiment. The TV box expansion device may include a processor 510, a receiver 520, and a transmitter 530; where the receiver 520 is configured to receive a radio television signal by using a radio frequency port;

the processor 510 is configured to perform demodulation processing on the radio television signal to obtain a to-be-decoded digital signal; and the transmitter 530 is configured to send the to-be-decoded digital signal to an Internet Protocol IP TV box, so that the IP TV box performs decoding processing on the to-be-decoded digital signal to obtain the decoded digital signal for display output.

Optionally, the TV box expansion device and the IP TV box are connected to each other by using a high definition multimedia interface HDMI cable; and the transmitter 530 is configured to:

send the to-be-decoded digital signal to the IP TV box by using the HDMI cable.

Figure 6:
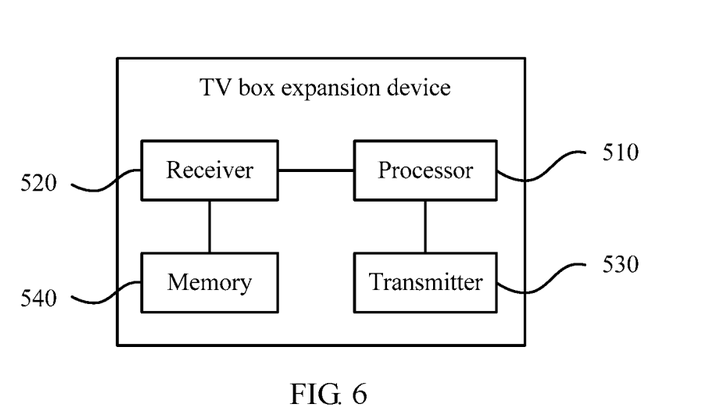
FIG. 6 is a schematic structural diagram of a TV box expansion device according to another embodiment of the present invention.

Optionally, as shown in FIG. 6, the receiver 520 is configured to receive the decoded digital signal sent by the IP TV box; and the TV box expansion device further includes a memory 540, configured to:

store the decoded digital signal.

Optionally, the radio television signal includes a first television signal and a second television signal;

the processor 510 is configured to perform demodulation processing on the first television signal to obtain a to-be-decoded first digital signal, and perform demodulation processing on the second television signal to obtain a to-be-decoded second digital signal;

the transmitter 530 is configured to send the to-be-decoded first digital signal and the to-be-decoded second digital signal to the Internet Protocol IP TV box;

the receiver 520 is further configured to receive a decoded second digital signal sent by the IP TV box; and the TV box expansion device further includes a memory, configured to:

store the decoded second digital signal.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

Embodiment 5

Figure 7:
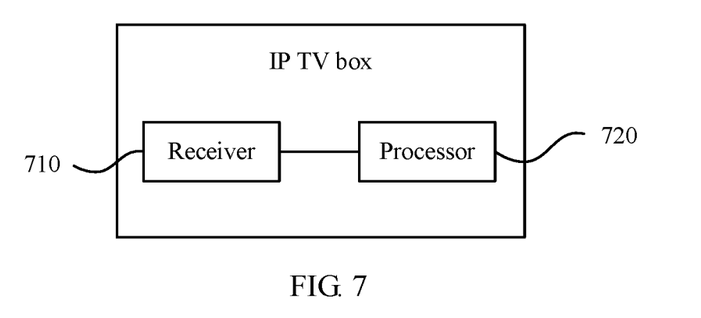
FIG. 7 is a schematic structural diagram of an IP TV box according to an embodiment of the present invention.

FIG. 7 is a schematic structural diagram of an IP TV box according to an embodiment of the present invention. The IP TV box may be configured to implement a signal display output method provided in the foregoing embodiment. The IP TV box may include a receiver 710 and a processor 720; where the receiver 710 is configured to receive a to-be-decoded digital signal sent by a TV box expansion device, where the to-be-decoded digital signal is a digital signal obtained, by the TV box expansion device, by performing demodulation processing on a radio television signal received by a radio frequency port; and the processor 720 is configured to perform decoding processing on the to-be-decoded digital signal to obtain the decoded digital signal for display output.

Optionally, the to-be-decoded digital signal includes a to-be-decoded first digital signal and a to-be-decoded second digital signal, where the to-be-decoded first digital signal is a to-be-decoded digital signal obtained, by the TV box expansion device, by demodulating a first television signal in the radio television signal, and the to-be-decoded second digital signal is a to-be-decoded digital signal obtained, by the TV box expansion device, by demodulating a second television signal in the radio television signal;

the processor 720 is configured to: perform decoding processing on the to-be-decoded first digital signal to obtain the decoded first digital signal for display output; and perform decoding processing on the to-be-decoded second digital signal to obtain the decoded second digital signal; and the IP TV box further includes a transmitter, configured to:

send the decoded second digital signal to the TV box expansion device, so that the TV box expansion device stores the decoded second digital signal.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

It should be noted that: when a signal display output apparatus provided in the foregoing embodiment performs signal display output, division of the function modules is only used as an example for description. In an actual application, the functions may be allocated to different function modules for implementation according to a requirement, that is, an internal structure of the apparatus is divided into different function modules to implement all or a part of functions described above. In addition, the signal display output apparatus provided in the foregoing embodiment pertains to a same conception as the embodiment of the signal display output method. For a detailed implementation process thereof, refer to the method embodiment, and details are not described herein.

Embodiment 6

Based on a same technical conception, an embodiment of the present invention further provides a signal display output system, where the system includes an IP TV box and a TV box expansion device;

the TV box expansion device is configured to: receive a radio television signal by using a radio frequency port; perform demodulation processing on the radio television signal to obtain a to-be-decoded digital signal; and send the to-be-decoded digital signal to the IP TV box; and the IP TV box is configured to: receive the to-be-decoded digital signal sent by the TV box expansion device; and perform decoding processing on the to-be-decoded digital signal to obtain the decoded digital signal for display output.

In this embodiment of the present invention, a TV box expansion device receives a radio television signal by using a radio frequency port, the TV box expansion device performs demodulation processing on the radio television signal to obtain a to-be-decoded digital signal, and the TV box expansion device sends the to-be-decoded digital signal to an IP TV box, so that the IP TV box performs decoding processing on the to-be-decoded digital signal to obtain the decoded digital signal for display output. In this way, the IP TV box can not only perform display output on a digital television signal transmitted on the Internet, but also perform display output on a radio television signal transmitted by a radio frequency line, thereby improving use flexibility of the IP TV box.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A signal display output method, comprising:
receiving, by a TV box expansion device, a radio television signal by using a radio frequency port, wherein the radio television signal comprises a first television signal and a second television signal;
performing, by the TV box expansion device, demodulation processing on the radio television signal to obtain a to-be-decoded digital signal, comprising:
performing, by the TV box expansion device, demodulation processing on the first television signal to obtain a to-be-decoded first digital signal, and performing demodulation processing on the second television signal to obtain a to-be-decoded second digital signal;
sending, by the TV box expansion device, the to-be-decoded digital signal to an Internet Protocol (IP) TV box for decoding processing on the to-be-decoded digital signal to obtain a decoded digital signal for display output, comprising:
sending, by the TV box expansion device, the to-be-decoded first digital signal and the to-be-decoded second digital signal to the Internet Protocol (IP) TV box; and
receiving and storing, by the TV box expansion device, a decoded second digital signal sent by the IP TV box.

2. The method according to claim 1, wherein
sending, by the TV box expansion device, the to-be-decoded digital signal to an Internet Protocol (IP) TV box comprises:
sending, by the TV box expansion device, the to-be-decoded digital signal to the IP TV box via a high definition multimedia interface (HDMI) cable.

3. The method according to claim 1, wherein after sending, by the TV box expansion device, the to-be-decoded digital signal to an Internet Protocol (IP) TV box, the method further comprises:
receiving and storing, by the TV box expansion device, the decoded digital signal sent by the IP TV box.

4. A signal display output method, comprising:
receiving, by an Internet Protocol (IP) TV box, a to-be-decoded digital signal sent by a TV box expansion device, wherein the to-be-decoded digital signal is obtained, by the TV box expansion device, by performing demodulation processing on a radio television signal received by a radio frequency port, wherein the to-be decoded signal comprises a to-be-decoded first digital signal and a to-be-decoded second digital signal, wherein the to-be-decoded first digital signal is obtained, by the TV box expansion device, by demodulating a first television signal in the radio television signal, and the to-be-decoded second digital signal is obtained, by the TV box expansion device, by demodulating a second television signal in the radio television signal; and
performing, by the IP TV box, decoding processing on the received to-be-decoded digital signal to obtain a decoded digital signal for display output, comprising:
performing, by the IP TV box, decoding processing on the to-be-decoded first digital signal to obtain the decoded first digital signal for display output;
performing, by the IP TV box, decoding processing on the to-be-decoded second digital signal to obtain the decoded second digital signal; and
sending, by the IP TV box, the decoded second digital signal to the TV box expansion device for storing the decoded second digital signal.

5. A TV box expansion device, comprising:
a receiver, configured to receive a radio television signal by using a radio frequency port, wherein the radio television signal comprises a first television signal and a second television signal;
a processor, configured to:
perform demodulation processing on the radio television signal to obtain a to-be-decoded digital signal, and
perform demodulation processing on the first television signal to obtain a to-be-decoded first digital signal, and perform demodulation processing on the second television signal to obtain a to-be-decoded second digital signal;

a transmitter, configured to:
  send the to-be-decoded digital signal to an Internet Protocol (IP) TV box for decoding processing on the to-be-decoded digital signal to obtain a decoded digital signal for display output, and
  send the to-be-decoded first digital signal and the to-be-decoded second digital signal to the IP TV box;
the receiver is further configured to:
  receive a decoded second digital signal sent by the IP TV box; and
a memory, configured to store the decoded second digital signal.

6. The device according to claim 5, wherein:
the receiver is configured to receive the decoded digital signal sent by IP TV box; and
the memory is configured to store the received decoded digital signal.

7. An Internet Protocol (IP) TV box, comprising:
a receiver, configured to receive a to-be-decoded digital signal sent by a TV box expansion device, wherein the to-be-decoded digital signal obtained, by the TV box expansion device, by performing demodulation processing on a radio television signal received by a radio frequency port, wherein the to-be-decoded digital signal comprises a to-be-decoded first digital signal and a to-be-decoded second digital signal, wherein the to-be-decoded first digital signal is obtained, by the TV box expansion device, by demodulating a first television signal in the radio television signal, and the to-be-decoded second digital signal is obtained, by the TV box expansion device, by demodulating a second television signal in the radio television signal; and
a processor, configured to:
  perform decoding processing on the received to-be-decoded digital signal to obtain a decoded digital signal for display output, and
  perform decoding processing on the to-be-decoded first digital signal to obtain the decoded first digital signal for display output; and perform decoding processing on the to-be-decoded second digital signal to obtain the decoded second digital signal; and
a transmitter, configured to send the decoded second digital signal to the TV box expansion device for storing the decoded second digital signal.

8. A signal display output system, comprising:
a TV box expansion device configured to:
  receive a radio television signal by using a radio frequency port, wherein the radio television signal comprises a first television signal and a second television signal,
  perform demodulation processing on the radio television signal to obtain a to-be-decoded digital signal, comprising:
  perform demodulation processing on the first television signal to obtain a to-be-decoded first digital signal, and perform demodulation processing on the second television signal to obtain a to-be-decoded second digital signal, and
  send the to-be-decoded digital signal, comprising: sending the to-be-decoded first digital signal and the to-be-decoded second digital signal; and
an Internet Protocol (IP) TV box configured to:
  receive the to-be-decoded digital signal sent by the TV box expansion device, and
  perform decoding processing on the received to-be-decoded digital signal to obtain a decoded digital signal for display output.

9. The signal display output system according to claim 8, wherein the IP TV box is configured to:
receive the to-be-decoded first digital signal and the to-be-decoded second digital signal from the TV box expansion device; and
send a decoded second digital signal to the TV box expansion device.

* * * * *